Figures 1, 2:
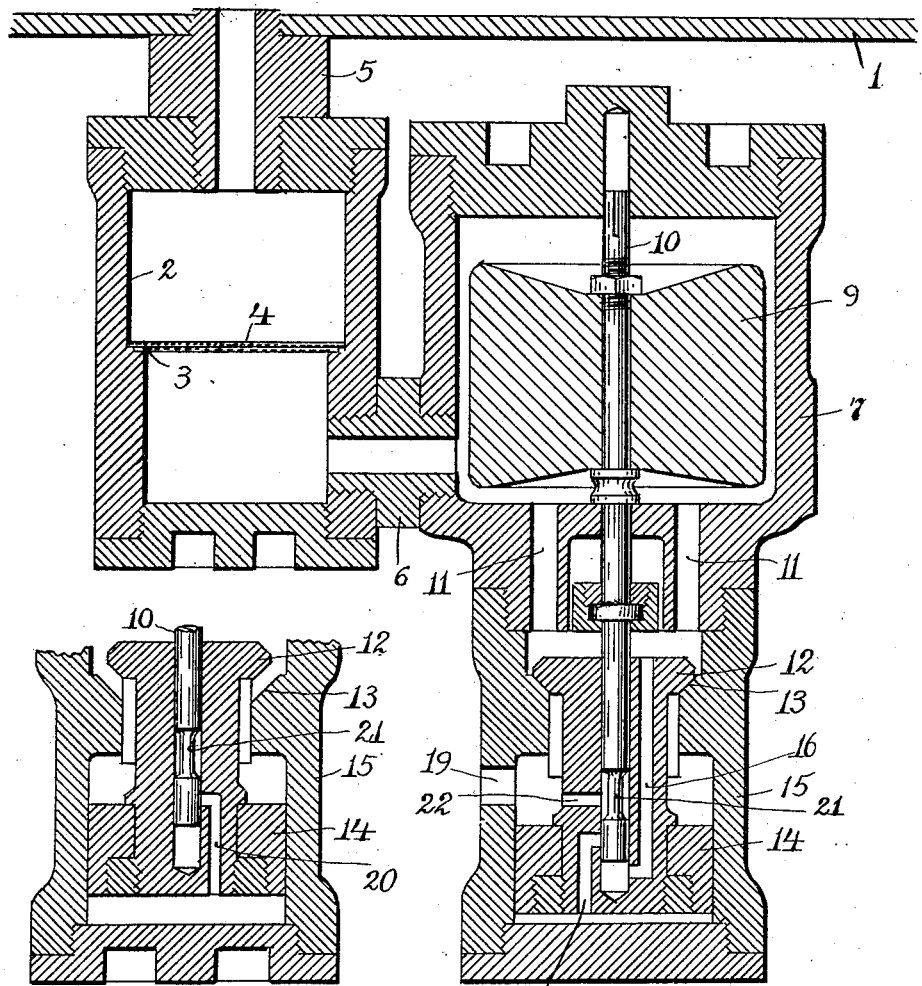

March 10, 1925.

V. C. WINKELEER 1,529,334

MEANS FOR ABSTRACTING WATER FROM COMPRESSED AIR

Filed July 19, 1924

Inventor,
Victor C. Winkeleer
By A. B. Upham
Attorney.

Patented Mar. 10, 1925.

1,529,334

UNITED STATES PATENT OFFICE.

VICTOR C. WINKELEER, OF BOSTON, MASSACHUSETTS, ASSIGNOR TO WINKELEER AUTOMATIC VALVE CO., OF BOSTON, MASSACHUSETTS, A VOLUNTARY TRUST ASSOCIATION.

MEANS FOR ABSTRACTING WATER FROM COMPRESSED AIR.

Application filed July 19, 1924. Serial No. 727,032.

*To all whom it may concern:*

Be it known that I, VICTOR C. WINKELEER, a citizen of the United States, and a resident of the city of Boston, in the county of Suffolk and Commonwealth of Massachusetts, have invented certain new and useful Improvements in Means for Abstracting Water from Compressed Air, of which the following is a full, clear and exact specification.

A difficulty met with in the operation of air brakes and other air-compressing mechanisms is that of the collection of water in the reservoir and other parts, thereby interfering with the proper functioning of the same and necessitating the frequent turning of a pet cock for permitting the escape of the water. In doing this there always occurs an unavoidable loss of the compressed air and a consequent waste of power.

Moreover, during winter weather the water of condensation is liable to collect in the pipes of the air brake apparatus and to burst the same. Even if the pipes are not thus broken, the ice formed therein will prevent the operation of the brakes and may entail most disastrous accidents.

The object of this invention is the effecting of means for automatically discharging all collections of water in the air reservoir, and at the same time to entirely avoid the escape of the air under compression.

In addition to this, I provide means for removing from the air reservoir all collections of dirt and other sediment which might interfere with the proper actuation of the air brake.

In the drawings forming part of this specification, Fig. 1 is a central vertical section of apparatus embodying my improvements. Fig. 2 is a sectional elevation of a part thereof but on a plane at right angles to that of Fig. 1.

The reference numeral 1 designates a portion of an air reservoir to which my water separator is connected, and 2 is the chamber containing the straining means. The latter has a ledge 3 at approximately its midheight upon which are seated strainers consisting of a filter 4 preferably composed of a close-mesh fabric of fine brass wire.

This filter chamber 2 is connected with the reservoir 1 by a screw plug 5 apertured for the free passage of any water from the reservoir to the filter. Below the filter, an apertured screw plug 6 joins the chamber 2 to the float chamber 7 in which is a float 9 preferably composed of cork fastened upon a vertical stem 10. Through the floor of this float chamber are holes 11 opening to the valve 12 loose upon this stem and normally resting upon and closing the valve seat 13. Attached to the extended lower end of the valve 12 is a piston 14 slidable liquid-tight in the cylinder 15, the area of the piston being considerably in excess of that of the upper surface of the valve 12.

The valve stem 10 reaches nearly to the lower end of the valve and piston, and opening beneath the stem is a conduit 16 whose vertical section opens through the top of the valve, so that when a small amount of water has descended through the filter chamber into the float chamber 7, it passes down through the openings 11 and thence through the conduit 16 beneath the stem 10 until these spaces are full. When sufficient water has entered the float chamber to elevate the float 9 to a point which brings the lower end of the stem above a conduit 17 whose lower end opens into the space beneath the piston, then the water passes into this space, and, the piston area being greater than the valve-area the piston and valve will be raised against the pressure of the water above the valve 12, and all the water in the float chamber and in the spaces below the same will immediately be shot out through a port 19 in the wall of the cylinder 15, being urged out by the air pressure behind it. No air can, however, escape, for as soon as the water level in the float chamber 7 sinks below the float 9, the latter falls and the lower end of the stem 10 closes the conduit 16 so that no more water can find its way beneath the piston 14. At the same time that the stem 10 sinks to its normal position and the conduit 16 is closed, the weight of the valve 12 and piston 14 forces the water beneath the latter to escape therefrom through a conduit 20 whose lower end opens from the space beneath the piston, as shown in Fig. 2, upward to the space about a neck 21 formed in the stem 10, and thence out through a port 22 and the port 19. The valve 12 then setles down upon its seat and no air can escape. When sufficient water has again accumulated in the float chamber 7, the same operation repeats itself again.

What I claim as my invention is:

1. A liquid abstracting device comprising a chamber adapted to receive a limited amount of liquid, a float in said chamber, an escape port, a valve normally closing escape of the liquid through said port, and means controlled by said float permitting said valve to be opened and closed by the presence and absence of liquid in said chamber.

2. A device for abstracting liquid from a gas under pressure, comprising a chamber adapted to receive the liquid, a float in said chamber having a stem descending therefrom, a valve and valve seat beneath said chamber communicating therewith, the valve being independent of said float, a cylinder surrounding the lower portion of said valve, the latter having a piston slidably fitting said cylinder, the cylinder having a port, and means controlled by said stem for admitting liquid beneath said piston from above the valve, the area of said piston being greater than that of the valve, whereby the pressure of the liquid beneath said piston opens said valve.

3. A device for abstracting liquid from a gas under pressure comprising a chamber adapted to receive the liquid, a gravity valve controlling the escape of liquid from said chamber, and means whereby the valve is opened by the pressure of the liquid and closes when the pressure becomes reduced.

4. A device for abstracting liquid from a gas under pressure, comprising a chamber adapted to receive the liquid, a gravity valve controlling the escape of liquid from said chamber, means whereby the valve is raised by the liquid pressure beneath it, and means whereby the descent of the valve when closing expels the liquid from beneath it.

5. A device for abstracting liquid from a gas under pressure, comprising a chamber adapted to receive the liquid, a valve controlling the escape of liquid therefrom, and means whereby the weight of liquid therein opens said valve and the absence of the liquid closes the same without permitting the escape of the gas under pressure.

6. A device for abstracting liquid from a gas under pressure, comprising a chamber adapted to receive the liquid, a float therein having a stem descending therefrom, a valve normally closing the escape of the liquid from said chamber, said stem descending liquid-tight in said valve, a piston attached to the lower end of said valve, a cylinder enclosing said piston, a conduit leading down from the top of the valve and opening into the space which receives the lower end of said stem, and a conduit leading upward from the under surface of said piston and opening into said space, communication between said conduits being normally closed by said stem.

7. A device for abstracting liquid from a gas under pressure, comprising a chamber adapted to receive the liquid, a float in said chamber having a stem descending therefrom, a valve loosely receiving said stem and controlling the escape of liquid from said chamber, means whereby the upward pressure of the liquid overcomes the downward pressure on the valve, means controlled by said stem for admitting liquid below the valve when the float is elevated, and means controlled by said stem for permitting the liquid to escape from below said valve when the float is in its normal position.

8. The combination with a reservoir for gas under pressure, of a filter chamber for filtering any liquid descending from the reservoir, and a chamber communicating with the filter chamber and provided with means for permitting the escape of liquid therefrom and adapted to be closed when such liquid has escaped.

In testimony that I claim the foregoing invention, I have hereunto set my hand this 18th day of July, 1924.

VICTOR C. WINKELEER.